United States Patent
Margraf et al.

(10) Patent No.: US 11,708,888 B2
(45) Date of Patent: Jul. 25, 2023

(54) SHAFT FOR A MOTOR VEHICLE TRANSMISSION

(71) Applicant: ZF Friedrichshafen AG, Friedrichshafen (DE)

(72) Inventors: Christoph Margraf, Markdorf (DE); Carl Schilling, Weingarten (DE); Martin Brehmer, Tettnang (DE); Oliver Angele, Weingarten (DE); Manuel Steinmann, Gersheim (DE); Sebastian Freis, Etzling (FR); Felix Fink, Friedrichshafen (DE); Tamas Gyarmati, Bermatingen (DE); Stefan Benz-Breitweg, Wolfegg (DE); Robert Reiser, Nenzingen (DE); Christian Staiger, Immenstaad (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/288,320

(22) PCT Filed: Oct. 23, 2019

(86) PCT No.: PCT/EP2019/078780
§ 371 (c)(1),
(2) Date: Apr. 23, 2021

(87) PCT Pub. No.: WO2020/083949
PCT Pub. Date: Apr. 30, 2020

(65) Prior Publication Data
US 2021/0370766 A1    Dec. 2, 2021

(30) Foreign Application Priority Data
Oct. 26, 2018  (DE) .................... 10 2018 218 400.3

(51) Int. Cl.
*F16H 57/04*  (2010.01)

(52) U.S. Cl.
CPC .................... *F16H 57/043* (2013.01)

(58) Field of Classification Search
CPC ........... F16H 57/043; F16H 2061/0046; F16H 57/0473; F16H 57/04; F16D 25/10; F16D 48/0206
See application file for complete search history.

(56) References Cited

U.S. PATENT DOCUMENTS

| 4,134,483 A * | 1/1979 | Horsch | ................. F16D 25/123 |
| | | | 192/85.61 |
| 6,171,207 B1 * | 1/2001 | Ehrlich | ................... F16H 55/56 |
| | | | 474/18 |

(Continued)

FOREIGN PATENT DOCUMENTS

| DE | 102005037940 A1 | 2/2006 |
| DE | 102007007369 A1 | 8/2008 |

(Continued)

OTHER PUBLICATIONS

International Search Report (English Translation) PCT/EP2019/078780, dated Dec. 20, 2019. (2 pages).

(Continued)

*Primary Examiner* — Richard W Ridley
*Assistant Examiner* — Aimee Tran Nguyen
(74) *Attorney, Agent, or Firm* — Dority & Manning, P.A.

(57) ABSTRACT

A shaft (W) for a motor vehicle transmission (G) includes four axial bore holes (B1, B2, B3, B4) for conducting fluid within the shaft (W). A central axis of each of the four bore holes (B1, B2, B3, B4) is spaced apart from an axis of rotation (WA) of the shaft (W). A radial distance (r1) between the central axis of at least two of the four bore holes (B1, B2, B3, B4) and the axis of rotation (WA) differs from a radial distance (r2) between the central axis of one of the remaining bore holes and the axis of rotation (WA). A (Continued)

transmission (G) for a motor vehicle with a shaft (W) is also provided.

20 Claims, 4 Drawing Sheets

(56) References Cited

U.S. PATENT DOCUMENTS

| | | | |
|---|---|---|---|
| 8,075,441 B2 | 12/2011 | Hart et al. | |
| 9,194,482 B2* | 11/2015 | Goleski | F16H 57/0484 |
| 2004/0147361 A1* | 7/2004 | Yasuda | F16H 57/0482 |
| | | | 475/331 |
| 2006/0191746 A1* | 8/2006 | Diosi | F16C 3/02 |
| | | | 184/6.18 |
| 2009/0247343 A1* | 10/2009 | Hart | F16H 61/0009 |
| | | | 475/276 |
| 2013/0337963 A1* | 12/2013 | Mellet | F16H 3/66 |
| | | | 475/275 |
| 2018/0180164 A1* | 6/2018 | Hagino | B60K 6/445 |

FOREIGN PATENT DOCUMENTS

| | | | |
|---|---|---|---|
| DE | 102009014731 A1 | 11/2009 | |
| DE | 102010041401 A1 * | 3/2012 | F16N 25/04 |
| DE | 112006002813 B4 | 10/2016 | |
| EP | 2096335 A1 * | 9/2009 | F16D 21/04 |
| EP | 2096335 A1 | 9/2009 | |
| JP | 3389172 B2 | 3/2003 | |
| WO | WO01011272 A1 | 2/2001 | |

OTHER PUBLICATIONS

German Search Report 102018218400.3, dated Apr. 30, 2019. (12 pages).

* cited by examiner

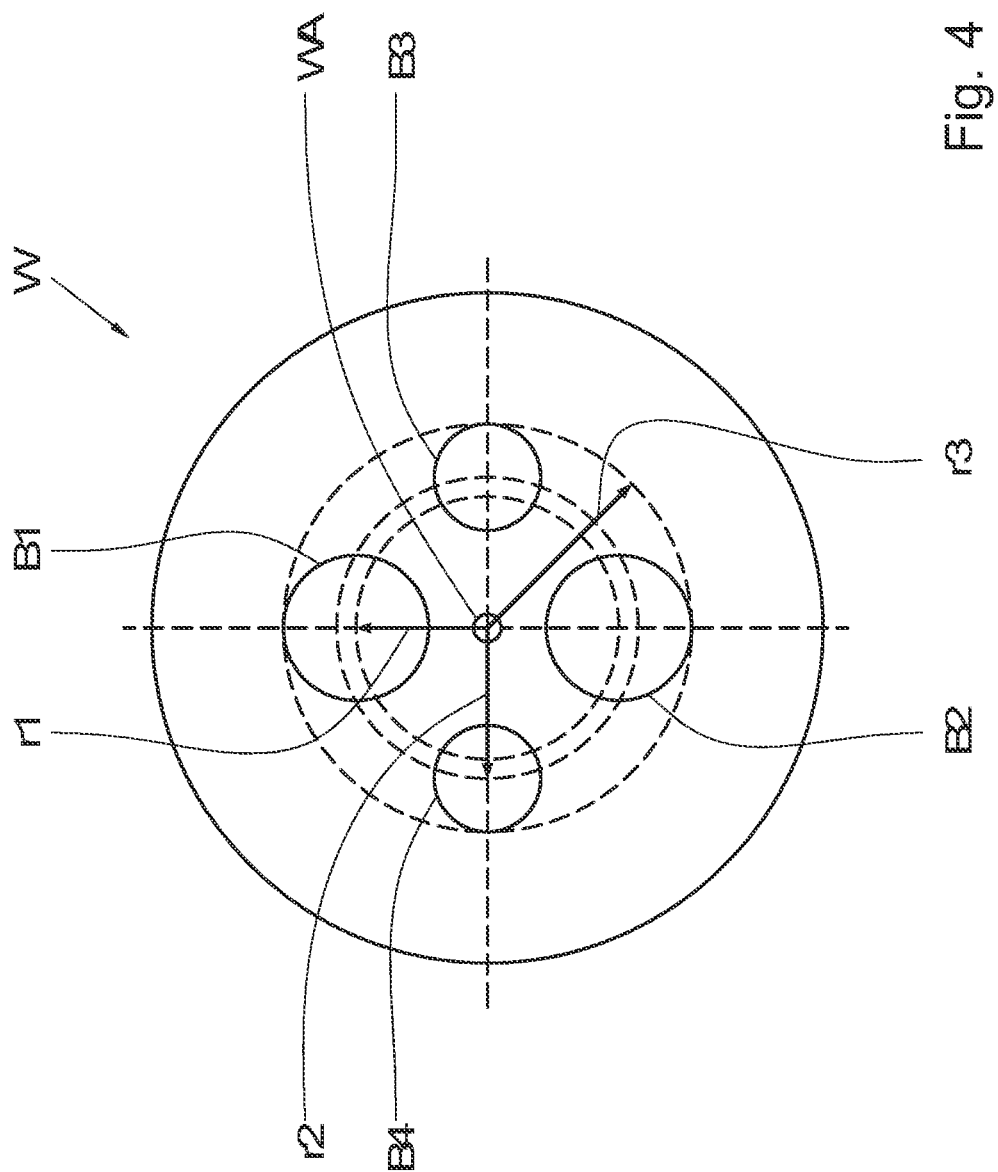

SHAFT FOR A MOTOR VEHICLE TRANSMISSION

CROSS-REFERENCE TO RELATED APPLICATIONS

The present application is related and has right of priority to German Patent Application No. 102018218400.3 filed in the German Patent Office on Oct. 26, 2018 and is a nationalization of PCT/EP2019/078780 filed in the European Patent Office on Oct. 23, 2019, both of which are incorporated by reference in their entirety for all purposes.

FIELD OF THE INVENTION

The invention relates generally to a shaft for a motor vehicle transmission, and to a transmission for a motor vehicle with a shaft of this type.

BACKGROUND

From the prior art, it is known with respect to motor vehicle transmissions to supply hydraulic fluid to elements of the transmission via bore holes extending in a transmission shaft. For example, DE 10 2009 014 731 A1 describes a multi-speed transmission, the input shaft of which has four bore holes.

In such a design, it is essential that the shaft still have sufficient strength despite the bore holes. An outer diameter of the shaft is to be kept as small as possible, in order to keep the diameter of the shaft bearings and of sealing elements acting on the shaft small. In addition, it must be taken into account that various high pressures can act in the bore holes. If the wall thickness between the bore holes is too small, breakthroughs can form between the bore holes during operation, thereby resulting in hydraulic short circuits. The tolerances must be taken into account during the formation of the bore holes, since, particularly in the case of relatively deep bore holes, an oblique position of the drilling axis can considerably reduce the wall thickness between the bore holes.

BRIEF SUMMARY OF THE INVENTION

Example aspects of the invention is therefore that of providing a shaft that has a high strength despite four axial bore holes.

A shaft is provided for a motor vehicle transmission, which has four axial bore holes. Each of the four bore holes is provided for conducting fluid within the shaft. According to example aspects of the invention, a central axis of each of the four bore holes is spaced apart from an axis of rotation of the shaft. Moreover, a radial distance between the central axis of at least two of the bore holes and the axis of rotation of the shaft differs from a radial distance between the central axis of the remaining bore hole or bore holes and the axis of rotation of the shaft. In other words, at least two of the four bore holes are arranged on at least one other diameter of the shaft cross-section than the remaining bore hole or the remaining bore holes. Due to this inconsistent radial distribution of the bore holes, the wall thickness between the bore holes as well as the annular area between the outer diameter of the shaft and the bore holes can be optimized in such a way that the necessary strength of the shaft is ensured.

Preferably, the radial distance between the central axis of precisely two of the four bore holes and the axis of rotation of the shaft is identical. Preferably, the radial distance between the central axis of the remaining two bore holes and the axis of rotation of the shaft is identical. In an example embodiment of this type, the four bore holes can be uniformly arranged at the cross-section of the shaft, as the result of which the strength of the shaft can be optimized.

Preferably, the bore diameters of at least two of the four bore holes differ from each other. Due to the variation of the bore diameters in combination with the at least partially different distance of the bore holes to the axis of rotation, the strength of the shaft can be optimized.

An example embodiment is particularly preferred, in which the bore diameter of two of the four bore holes is identical. A far preferable example embodiment results when two of the four bore holes have the same bore diameter. An example embodiment of this type allows for a uniform arrangement of the four bore holes, which is advantageous for the strength.

Preferably, the bore diameter of the four bore holes is inversely proportional to the radial distance between the central axis of the four bore holes and the axis of rotation of the shaft. In other words, the bore diameter of bore holes arranged closer to the axis of rotation is greater than the bore diameter of bore holes that are farther away from the axis of rotation. It should be noted that the inversely proportional relationship between the distance of the bore holes from the axis of rotation and the bore diameter can be linear, although it need not be linear.

Preferably, the four bore holes are arranged in such a way that a radially outermost point of each of the four bore holes has the same radial distance to the axis of rotation of the shaft. An arrangement of this type facilitates a uniform arrangement of the bore holes in the shaft cross-section, which is conducive to the strength of the shaft.

The shaft can be an integral part of a transmission for a motor vehicle. Various types of transmissions are conceivable in this case, for example, automatic transmissions, dual clutch transmissions, transmissions with a continuously variable ratio, or automated manual transmissions. The transmission can utilize spur gear stages and/or planetary gear sets to form gears.

Preferably, at least one of the four bore holes is provided for supplying oil for a hydraulic actuation of a clutch of the transmission.

Preferably, the transmission includes a hydrodynamic torque converter with a torque converter lockup clutch, i.e., a clutch for the disconnectable connection of the impeller and the turbine wheel of the torque converter. In addition, the transmission can include a further clutch, which is connected upstream from the torque converter. The shaft described at the outset is particularly suited for an application of this type, since hydraulic fluid is routable to hydraulic actuating devices of the torque converter lockup clutch and of the further clutch via the shaft.

For example, a first of the four bore holes can be provided for supplying oil to or for discharging oil from the toroidal space of the torque converter. A second of the four bore holes can be provided for supplying lube oil to at least one component of the transmission, for example, for lubricating an antifriction bearing. A third of the four bore holes can be provided for supplying oil for the hydraulic actuation of the further clutch. A fourth of the four bore holes can be provided for supplying oil for the hydraulic actuation of the torque converter lockup clutch.

If the hydraulic actuator of the further clutch includes a pressure compensating cavity for the compensation of rotary forces, the second of the four bore holes is preferably utilized for supplying oil to this pressure compensating cavity.

The further clutch is preferably designed as a wet-running multi-disk clutch. In this case, an oil supply for cooling and lubricating the further clutch takes place at least partially via the second of the four bore holes. Further oil supply paths can also be provided for cooling the further clutch.

The shaft, in which the four bore holes are arranged, is preferably connected to the turbine wheel of the torque converter. This is a permanent, i.e., non-disconnectable, connection.

BRIEF DESCRIPTION OF THE DRAWINGS

One exemplary embodiment of the invention is described in detail in the following with reference to the attached figures, in which:

FIG. 4 shows a sectional view of a shaft of the transmission.

DETAILED DESCRIPTION

Figure 1:
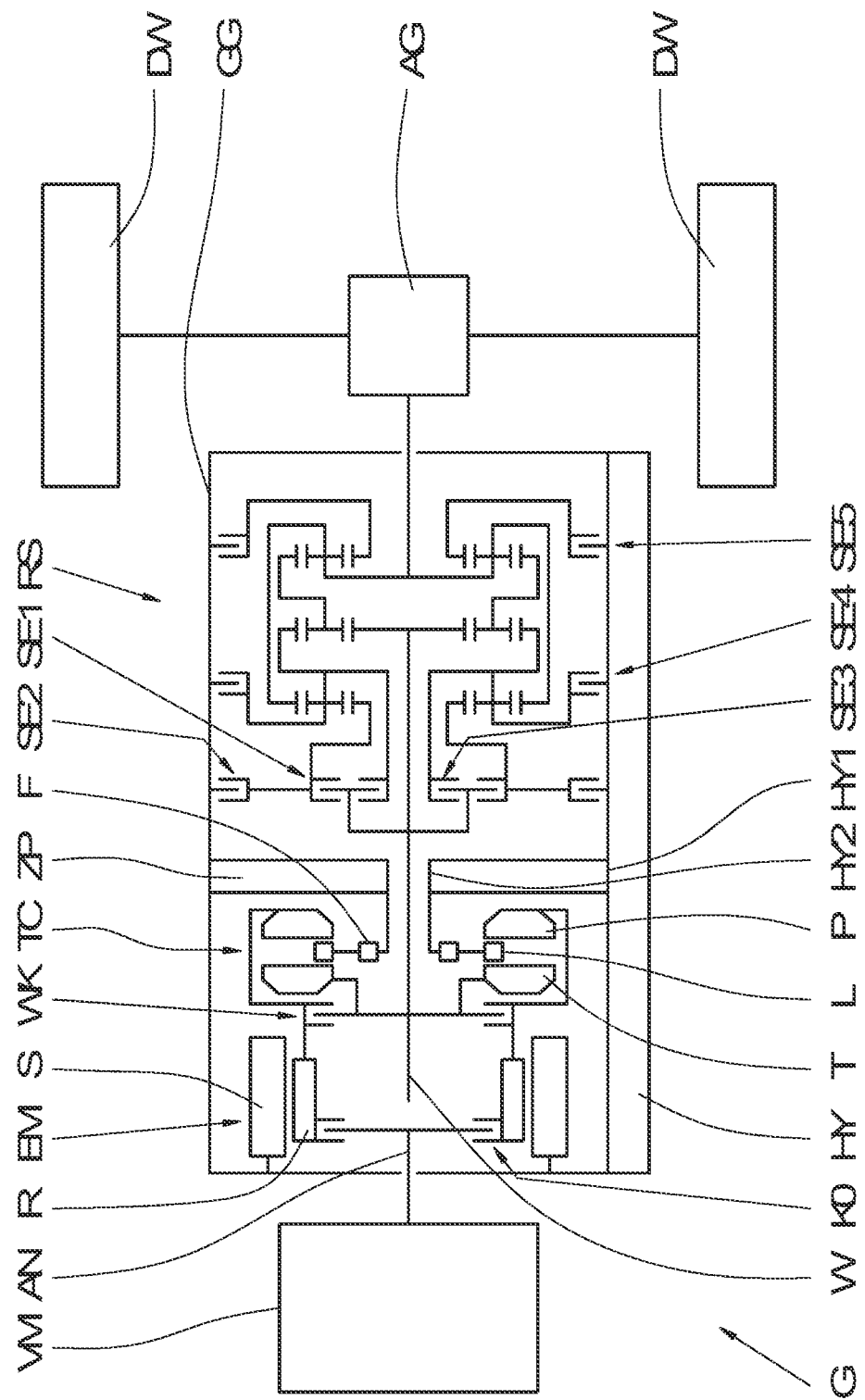
FIG. 1 shows a simplified representation of a motor vehicle drive train with a transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 diagramatically shows a drive train of a motor vehicle. The drive train includes an internal combustion engine VM, a transmission G with a shaft W, and a differential gear AG. The internal combustion engine VM is connected to an input shaft AN of the transmission G. A torsional vibration damper (not represented in FIG. 1) can be arranged in this connection between the internal combustion engine VM and the transmission G. An output shaft of the transmission G is connected to the differential gear AG, for example, via a cardan shaft. The power present at the output shaft is distributed to driving wheels DW of the motor vehicle by the differential gear AG. The drive train represented in FIG. 1 is to be considered merely as an example. For example, instead of the represented design with a drive train aligned longitudinally with respect to the direction of travel of the motor vehicle, an application of the transmission G in a drive train aligned transversely to the direction of travel is also conceivable. The differential gear AG can be integrated into a housing GG of the transmission G.

The transmission G includes a hydrodynamic torque converter TC with an impeller P, a turbine wheel T, a stator L, and a torque converter lockup clutch WK. The impeller P is connected to the turbine wheel T by engaging the torque converter lockup clutch WK. The stator L is supported via a freewheel unit F at a plate ZP attached to the housing GG. The turbine wheel T is connected to the shaft W. The transmission G further includes an electric machine EM with a rotationally fixed stator S and a rotary rotor R. The rotor R is connected to the impeller P and is connectable to the input shaft AN via a further clutch K0.

The transmission G includes a hydraulic unit HY. The hydraulic unit HY has a pump (not represented) and a hydraulic control unit (not represented). The pump can deliver hydraulic fluid to the hydraulic control unit. The hydraulic control unit is configured for distributing the hydraulic fluid to various hydraulic consumers of the transmission G according to demand. The appropriately divided flows can be supplied, via the plate ZP, to the torque converter TC for the actuation of the torque converter lockup clutch WK, for the actuation of the further clutch K0, for the lubrication of various components of the transmission G, and for the actuation of shift elements SE1, SE3 of the transmission G. For this purpose, the plate ZP has a first hydraulic interface HY1 to the hydraulic unit HY, and a second hydraulic interface HY2 to the shaft W.

With the transmission G, various gear ratios can be made available between the shaft W and the output shaft. For this purpose, the transmission G includes multiple planetary gear sets, which, together, are designated as the gear set RS. The shaft W acts as an input shaft of the gear set RS. The transmission G includes multiple shift elements SE1, SE2, SE3, SE4, SE5. The shift elements SE1, SE2, SE3, SE4, SE5 cooperate with the planetary gear sets to form gears of the transmission G. The transmission G according to the representation in FIG. 1 is to be considered merely as an example. Instead of the planetary gear sets, for example, spur gear trains can be utilized for the formation of gears.

Figure 2:
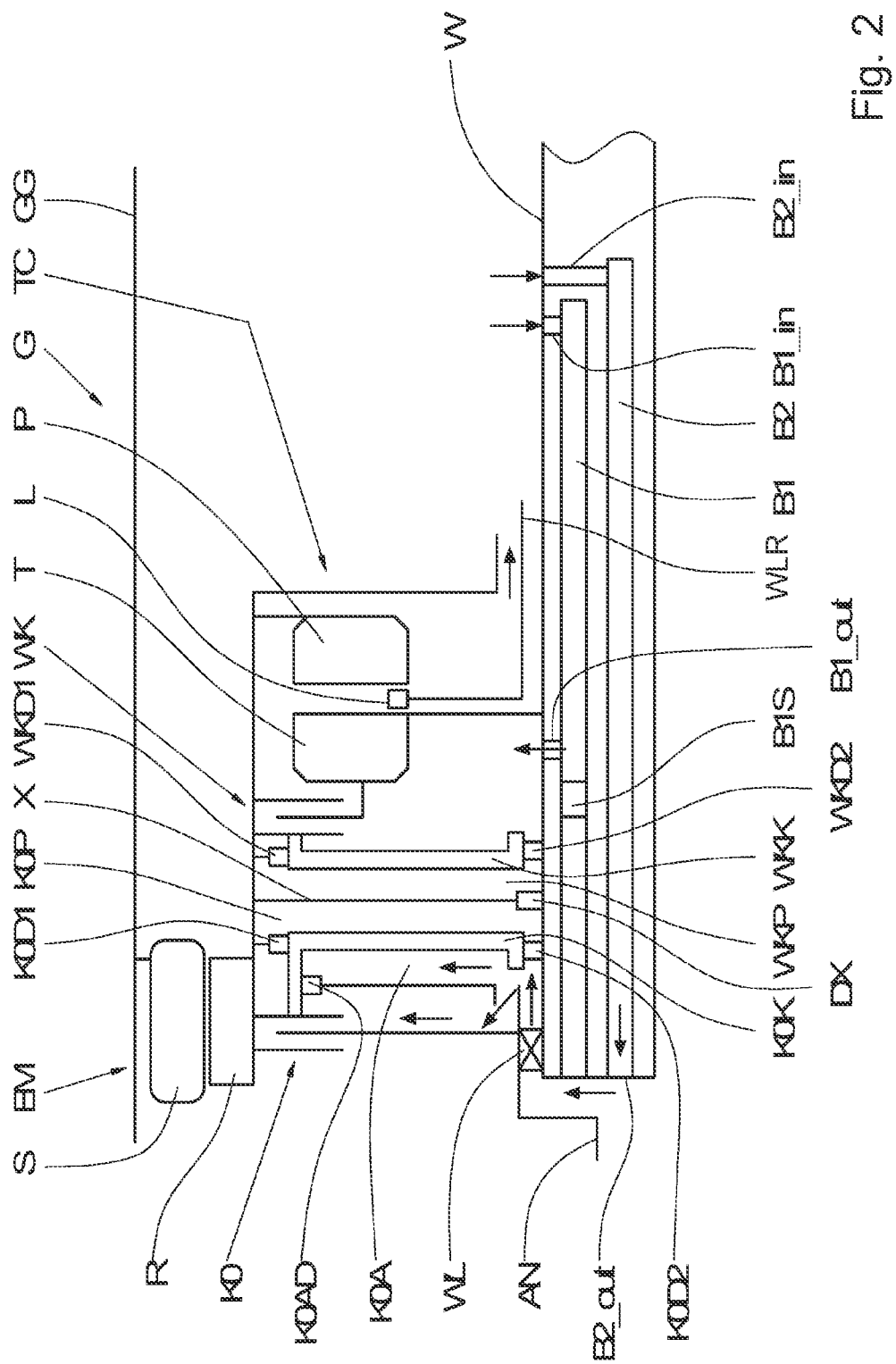
FIG. 2 and FIG. 3 each show a simplified sectional view of a section of the transmission.

FIG. 2 shows a simplified sectional view of a section of the transmission G. The torque converter lockup clutch WK is designed as a wet-running clutch and is actuated by a piston WKK, which is connected to a pressure chamber WKP. The piston WKK is guided between two seals WKD1, WKD2. The pressure chamber WKP is delimited, in sections or partially, by a radial wall X, which is connected to the impeller P. A gap between the wall X and the shaft W is sealed off by a seal DX.

The further clutch K0 is actuated via a piston K0K, which is connected to a pressure chamber K0P. The piston K0K is guided between two seals K0D1, K0D2. The pressure chamber K0P is delimited, in sections or partially, by the wall X. A pressure compensating cavity K0A is provided for the compensation of the rotary forces acting in the pressure chamber K0P. For this purpose, a baffle plate secured at the input shaft AN is provided, which is sealed with respect to the piston K0K via a seal K0AD. The piston K0K is arranged between the pressure chamber K0P and the pressure compensating cavity K0A. The shaft W is rotatably mounted at the input shaft AN via an antifriction bearing WL. Further antifriction bearings (not represented in FIG. 2) can be provided for mounting the shaft W and the input shaft AN.

In FIG. 2, the oil supply to the toroidal space of the torque converter TC as well as the oil supply to the antifriction bearing WL are represented. The cutting plane of the shaft W is selected in such a way that a bore hole B1 and a bore hole B2 are visible. The bore hole B1 is utilized for supplying oil to the toroidal space of the torque converter TC. Oil is fed to the bore hole B1 through a radial bore hole B1_in in the shaft W, wherein the oil can exit the shaft W through a radial bore hole B1_out. The supply of oil into the radial bore hole B1_in takes place via the plate ZP (not represented in FIG. 2). Oil is supplied, through the radial bore hole B1_out, to the torque converter lockup clutch WK and to the hydrodynamic path between the impeller P, the turbine wheel T, and the stator L. The oil discharge from the toroidal space of the torque converter TC can take place, for example, through a gap, which is arranged between a housing of the torque converter TC connected to the impeller P and a shaft WLR connected to the stator L. The corresponding oil path is indicated in FIG. 2 by arrows. Downstream from the bore hole B1_out, the bore hole B1 is closed by a cap B1S.

The bore hole B2 is utilized for supplying oil to the antifriction bearing WL, for filling the pressure compensating cavity K0A, and for supplying oil to the further clutch K0. Oil is supplied to the bore hole B2 through a radial bore hole B2_in in the shaft W, which exits at an opening B2_out in the end face of the shaft W. The supply of oil into the radial bore hole B2_in takes place via the plate ZP (not represented in FIG. 2). Due to the rotation of the shaft W, oil is slung radially outward toward an inner side of the input shaft AN. From there, the oil flows through the antifriction bearing WL in the direction of the seal K0D2. The oil enters the pressure compensating cavity K0A through an axial gap between an axial end of the input shaft AN and the piston K0K. If the pressure compensating cavity K0A is sufficiently filled with oil, the oil is fed to the further clutch K0. The corresponding oil path is indicated in FIG. 2 by arrows.

Figure 3:
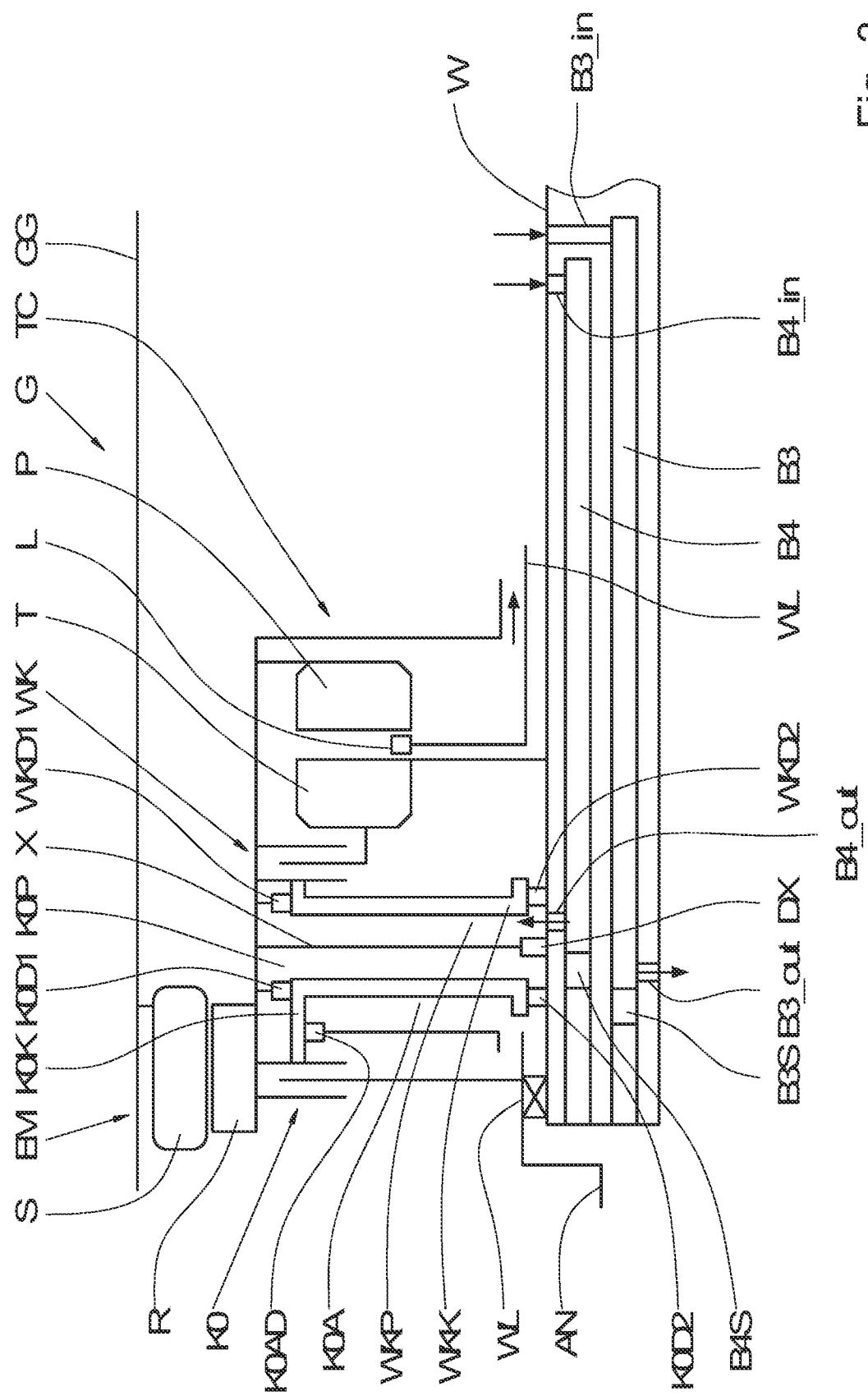

FIG. 3 shows a further simplified sectional view of a section of the transmission G, which essentially corresponds to the view represented in FIG. 2. The cutting plane through the shaft W was now selected in such a way that a bore hole B3 and a bore hole B4 are visible. The bore hole B3 is utilized for supplying oil to the pressure chamber K0P. Due to pressurization of the pressure chamber K0P, the further clutch K0 is hydraulically actuated. Oil is supplied to the bore hole B3 through a radial bore hole B3_in. The supply of oil into the radial bore hole B3_in takes place via the plate ZP (not represented in FIG. 3). The oil enters the pressure chamber K0P through a radial bore hole B3_out. Downstream from the bore hole B3_out, the bore hole B3 is closed by a cap B3S. The corresponding oil path is indicated in FIG. 3 by arrows.

The bore hole B4 is utilized for supplying oil to the pressure chamber WKP. Due to pressurization of the pressure chamber WKP, the torque converter lockup clutch WK is hydraulically actuated. Oil is supplied to the bore hole B4 through a radial bore hole B4_in. The supply of oil into the radial bore hole B4_in takes place via the plate ZP (not represented in FIG. 3). The oil enters the pressure chamber WKP through a radial bore hole B4_out. Downstream from the bore hole B4_out, the bore hole B4 is closed by a cap B4S. The corresponding oil path is indicated in FIG. 3 by arrows.

It is pointed out that the representation in FIG. 2 and FIG. 3 is merely diagrammatic, and does not reproduce a complete design. The representation in FIG. 2 and FIG. 3 is utilized, in particular, for illustrating the fluid supply to the torque converter TC, to the pressure chambers WKP, K0P, to the pressure compensating cavity K0A, to the antifriction bearing WL, and to the further clutch K0 through the bore holes B1 through B4 of the shaft W.

FIG. 4 shows a sectional view of the shaft W. The shaft W is centrally mounted, rotatable about an axis of rotation WA, and has four axial bore holes B1, B2, B3, B4. The bore holes B1, B2, on the one hand, and the bore holes B3, B4 have the same bore diameter. The bore diameter of the bore holes B1, B2 is greater than the bore diameter of the bore holes B3, B4. A radial distance, marked as r1, between the central axis of the bore holes B1, B2 and the axis of rotation WA is smaller than a radial distance, marked as r2, between the central axis of the bore holes B3, B4 and the axis of rotation WA. The four bore holes B1, B2, B3, B4 are arranged in such a way that a radial distance, marked as r3, between the axis of rotation WA and the radially outermost point of each of the four bore holes B1, B2, B3, B4 is identical. The representation in FIG. 4 is utilized mainly for illustration, and is not full-scale.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

VM internal combustion engine
G transmission
AN input shaft
GG housing
W shaft
WA axis of rotation of the shaft
B1 axial bore hole
B2 axial bore hole
B3 axial bore hole
B4 axial bore hole
r1, r2, r3 radial distance
B1_in radial bore hole
B1_out radial bore hole
B2_in radial bore hole
B2_out opening
B3_in radial bore hole
B3_out radial bore hole
B4_in radial bore hole
B4_out radial bore hole
B1S cap
B3S cap
B4S cap
TC torque converter
P impeller
T turbine wheel
L stator
WLR stator shaft
F freewheel unit
WK torque converter lockup clutch
WKP pressure chamber
WKK piston
WKD1 seal
WKD2 seal
X wall
DX seal
K0 further clutch
K0D1 seal
K0D2 seal
K0P pressure chamber
K0K piston
K0A pressure compensating cavity
K0AD seal
EM electric machine
S rotor
R stator
WL antifriction bearing HY hydraulic unit
HY1 first hydraulic interface
HY2 second hydraulic interface
RS gear set
SE1 shift element
SE2 shift element
SE3 shift element
SE4 shift element
SE5 shift element
AG differential gear
DW driving wheel

The invention claimed is:

1. A shaft (W) for a motor vehicle transmission (G), wherein:
the shaft (W) defines four axial bore holes (B1, B2, B3, B4) for conducting fluid within the shaft (W),
a central axis of each of the four bore holes (B1, B2, B3, B4) is spaced apart from an axis of rotation (WA) of the shaft (W),
a radial distance (r1) between the central axis of at least two of the four bore holes (B1, B2, B3, B4) and the axis of rotation (WA) differs from a radial distance (r2) between the central axis of one of the remaining bore holes of the four bore holes (B1, B2, B3, B4) and the axis of rotation (WA), and
the bore diameter of the four bore holes (B1, B2, B3, B4) is inversely proportional to the radial distance (r1, r2) between the central axis of the bore holes (B1, B2, B3, B4) and the axis of rotation (WA).

2. A transmission (G) for a motor vehicle, comprising the shaft (W) of claim 1, wherein at least one of the four bore holes (B1, B2, B3, B4) of the shaft (W) is configured for supplying oil for hydraulic actuation of a clutch (K0, WK) of the transmission (G).

3. A shaft (W) for a motor vehicle transmission (G), wherein:
the shaft (W) defines four axial bore holes (B1, B2, B3, B4) for conducting fluid within the shaft (W),
a central axis of each of the four bore holes (B1, B2, B3, B4) is spaced apart from an axis of rotation (WA) of the shaft (W),
a radial distance (r1) between the central axis of at least two of the four bore holes (B1, B2, B3, B4) and the axis of rotation (WA) differs from a radial distance (r2) between the central axis of one of the remaining bore holes of the four bore holes (B1, B2, B3, B4) and the axis of rotation (WA), and
the four bore holes (B1, B2, B3, B4) are arranged such that a radially outermost point of each of the four bore holes (B1, B2, B3, B4) is an identical radial distance (r3) from the axis of rotation (WA).

4. A transmission (G) for a motor vehicle, comprising the shaft (W) of claim 3.

5. The transmission (G) of claim 4, wherein at least one of the four bore holes (B1, B2, B3, B4) of the shaft (W) is configured for supplying oil for hydraulic actuation of a clutch (K0, WK) of the transmission (G).

6. The transmission (G) of claim 4, further comprising a hydrodynamic torque converter (TC) with a torque converter lockup clutch (WK) and an additional clutch (K0) connected upstream from the torque converter (TC).

7. A transmission (G) for a motor vehicle, comprising:
a hydrodynamic torque converter (TC) with a torque converter lockup clutch (WK);
an additional clutch (K0) connected upstream from the torque converter (TC); and
a shaft (W), wherein
the shaft (W) defines four axial bore holes (B1, B2, B3, B4) for conducting fluid within the shaft (W),
a central axis of each of the four bore holes (B1, B2, B3, B4) is spaced apart from an axis of rotation (WA) of the shaft (W),
a radial distance (r1) between the central axis of at least two of the four bore holes (B1, B2, B3, B4) and the axis of rotation (WA) differs from a radial distance (r2) between the central axis of one of the remaining bore holes of the four bore holes (B1, B2, B3, B4) and the axis of rotation (WA),
a first of the four bore holes (B1) in the shaft (W) is configured for supplying oil to or for discharging oil from a hydrodynamic path of the torque converter (TC),
a second of the four bore holes (B2) in the shaft (W) is configured for supplying lubrication oil to at least one component of the transmission (G),
a third of the four bore holes (B3) in the shaft (W) is configured for supplying oil for hydraulic actuation of the additional clutch (K0), and
a fourth of the four bore holes (B4) in the shaft (W) is configured for supplying oil for hydraulic actuation of the torque converter lockup clutch (WK).

8. The transmission (G) of claim 7, wherein the second of the four bore holes (B2) is further configured for supplying the oil for hydraulic actuation of the additional clutch (K0) from a pressure compensating cavity (K0A).

9. The transmission (G) of claim 7, wherein the additional clutch (K0) is configured as a wet-running multi-disk clutch, and the second of the four bore holes (B2) is configured for supplying cooling oil and lubrication oil to the additional clutch (K0).

10. The transmission (G) of claim 7, wherein the radial distance (r1) between the central axis of precisely two of the four bore holes (B1, B2, B3, B4) and the axis of rotation (WA) is identical.

11. The transmission (G) of claim 10, wherein the radial distance (r2) between the central axis of the remaining two of the four bore holes (B1, B2, B3, B4) and the axis of rotation (WA) is identical.

12. The transmission (G) of claim 7, wherein each of at least two of the four bore holes (B1, B2, B3, B4) has a different, respective bore diameter.

13. The transmission (G) of claim 7, wherein each of at least two of the four bore holes (B1, B2, B3, B4) has an identical bore diameter.

14. The transmission (G) of claim 13, wherein precisely two of the four bore holes (B1, B2, B3, B4) have a first identical bore diameter, and the remaining two of the four bore holes (B1, B2, B3, B4) have a second identical bore diameter.

15. A transmission (G) for a motor vehicle, comprising:
a hydrodynamic torque converter (TC) with a torque converter lockup clutch (WK);
an additional clutch (K0) connected upstream from the torque converter (TC); and
a shaft (W), wherein
the shaft (W) defines four axial bore holes (B1, B2, B3, B4) for conducting fluid within the shaft (W),
a central axis of each of the four bore holes (B1, B2, B3, B4) is spaced apart from an axis of rotation (WA) of the shaft (W),
a radial distance (r1) between the central axis of at least two of the four bore holes (B1, B2, B3, B4) and the axis of rotation (WA) differs from a radial distance (r2) between the central axis of one of the remaining bore holes of the four bore holes (B1, B2, B3, B4) and the axis of rotation (WA), and the shaft (W) is connected to a turbine wheel (T) of the torque converter (TC).

16. The transmission (G) of claim 15, wherein the radial distance (r1) between the central axis of precisely two of the four bore holes (B1, B2, B3, B4) and the axis of rotation (WA) is identical.

17. The transmission (G) of claim 16, wherein the radial distance (r2) between the central axis of the remaining two of the four bore holes (B1, B2, B3, B4) and the axis of rotation (WA) is identical.

18. The transmission (G) of claim 15, wherein each of at least two of the four bore holes (B1, B2, B3, B4) has a different, respective bore diameter.

19. The transmission (G) of claim 15, wherein each of at least two of the four bore holes (B1, B2, B3, B4) has an identical bore diameter.

20. The transmission (G) of claim 19, wherein precisely two of the four bore holes (B1, B2, B3, B4) have a first identical bore diameter, and the remaining two of the four bore holes (B1, B2, B3, B4) have a second identical bore diameter.

* * * * *